April 2, 1963 R. E. BELL ETAL 3,084,285
PULSE GENERATOR FOR ELECTRONIC MULTIPLIER
Filed July 1, 1955 5 Sheets-Sheet 5
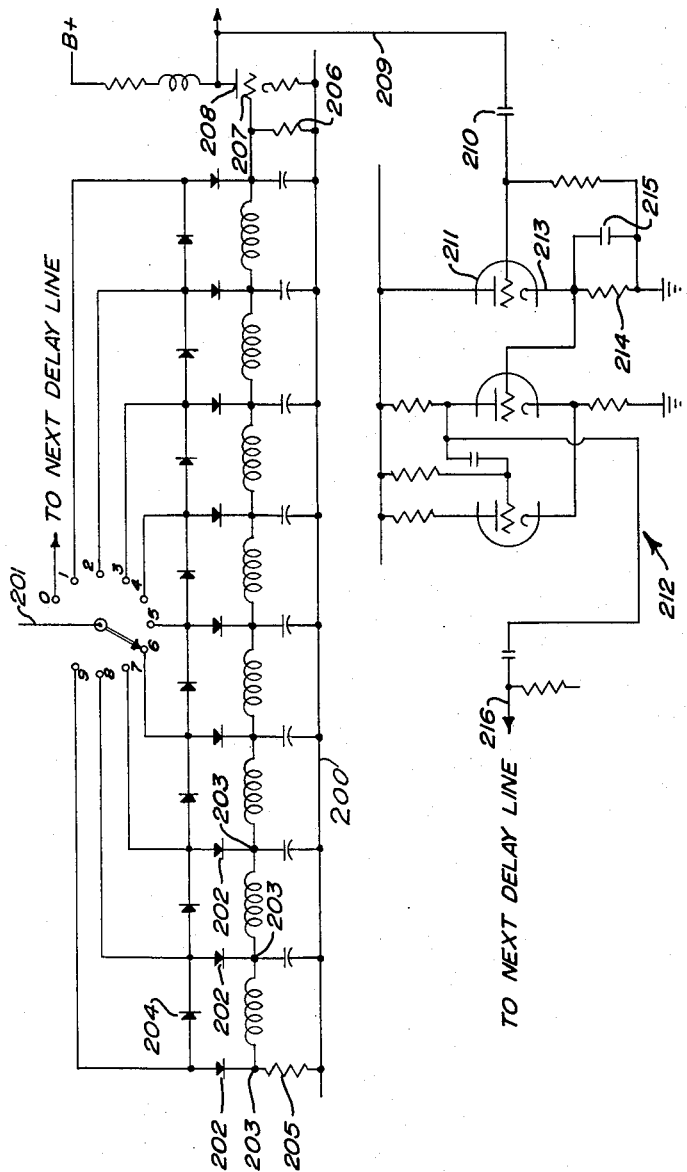
FIG. VII
INVENTORS
ROBERT E. BELL
MAYNARD C. YEASTING
BY
ATTORNEYS

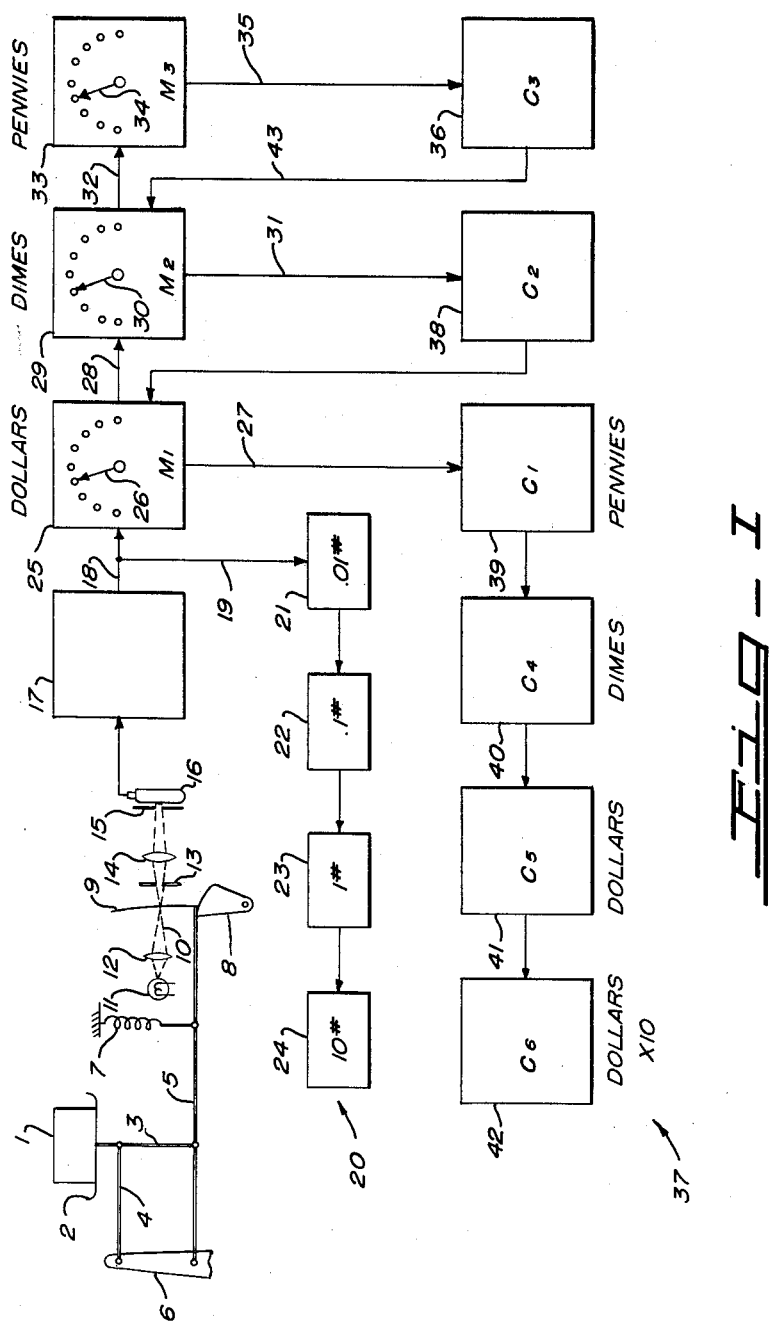

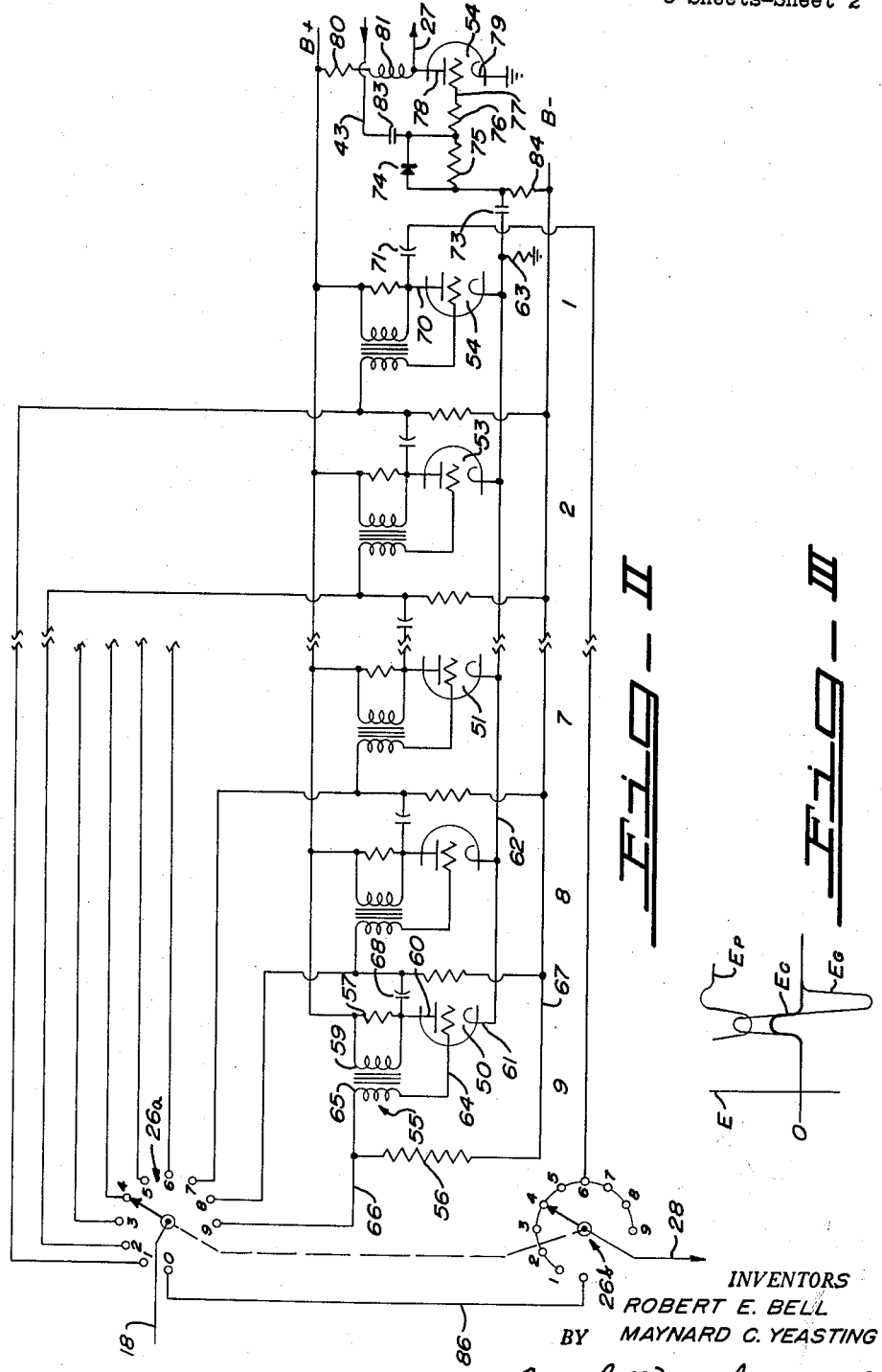

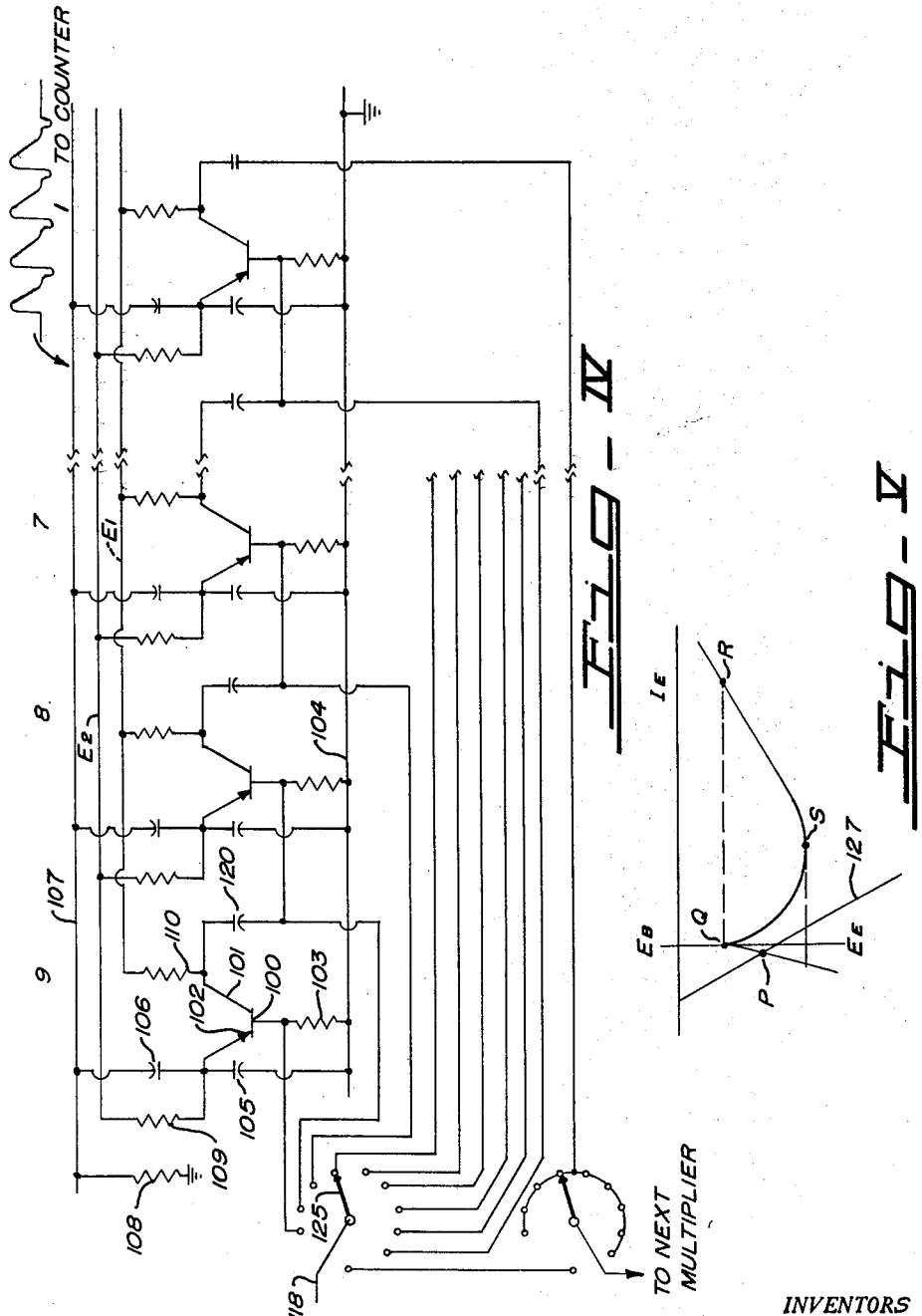

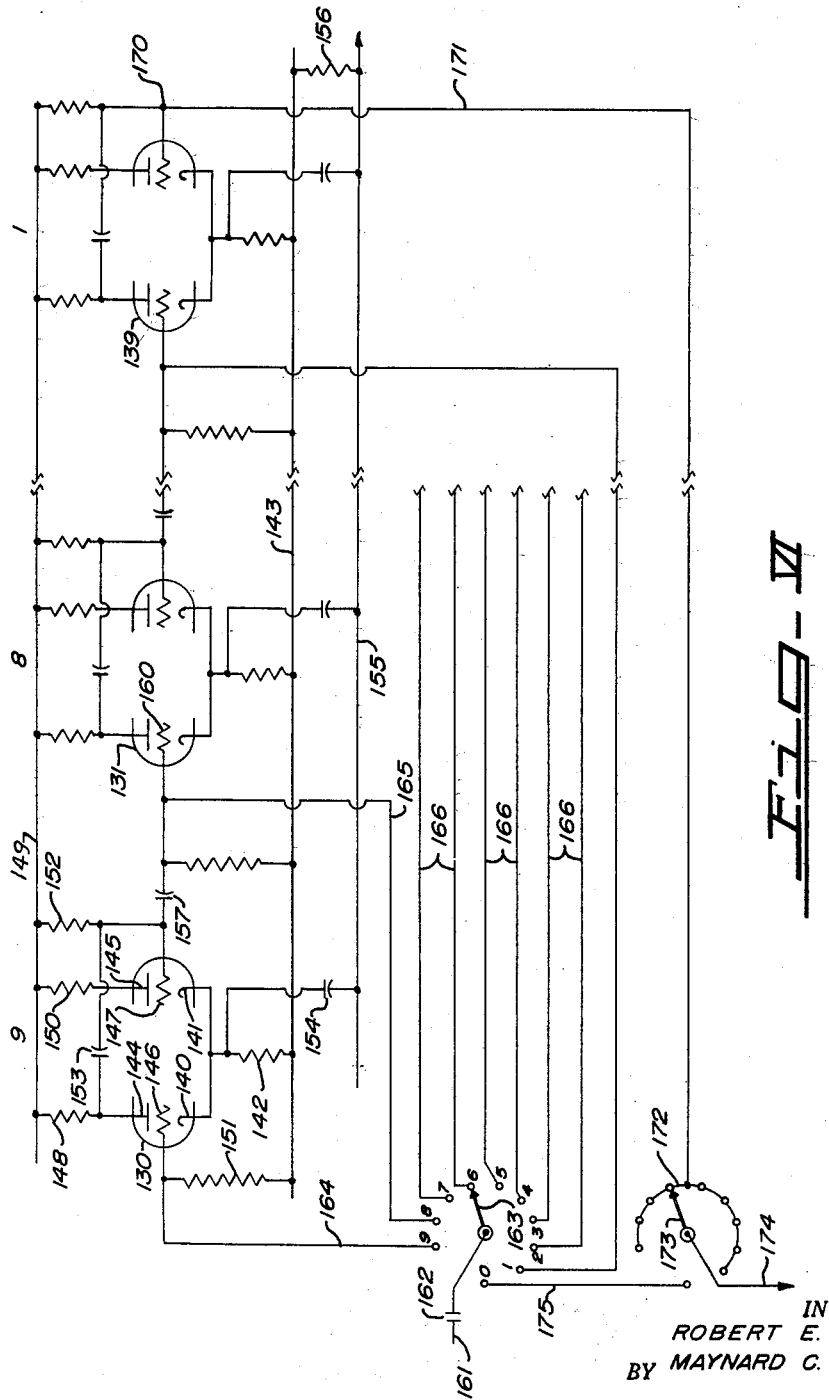

United States Patent Office 3,084,285
Patented Apr. 2, 1963

3,084,285
PULSE GENERATOR FOR ELECTRONIC
MULTIPLIER
Robert E. Bell, Toledo, and Maynard C. Yeasting, Elmore, Ohio, assignors, by mesne assignments, to Toledo Scale Corporation, Toledo, Ohio, a corporation of Ohio
Filed July 1, 1955, Ser. No. 519,468
4 Claims. (Cl. 328—34)

This invention relates to electronic computing equipment and in particular to a simplified electronic multiplication system adapted for use in weighing scales.

Many attempts have been made from time to time to construct weighing scales that would automatically provide indications of the weight of the product or commodity on the scale, and the value of such commodity computed at any selected price. When the number of given prices is small, that is not over 100, it has been common practice to provide a separate row or column of indicia on a rotatable chart for each price and a price chart for indicating the proper row of indicia according to the selected unit price. This system is satisfactory as long as only a visible indication is required and the number of prices is quite small.

It is desirable, particularly where goods are packaged prior to sale, to imprint a ticket for each package to show the weight, the price per unit of weight, and the value or the computed price of the particular package. The aforementioned charts having a plurality of rows of indicia are unsatisfactory for this purpose because there is no simple, readily available means for taking the information mechanically or electrically from the chart and converting it into signals that may be used to operate the printing mechanism for the tickets.

The principal object of this invention is to provide a simple electronic multiplying unit that may be used in cooperation with a weighing scale to provide in an output counter associated with the multiplier an indication of the value or the computed amount resulting from multiplying the weight of the commodity by the unit price.

Another object of the invention is to provide a simple electronic unit capable of delivering a selected number of pulses for each input pulse applied to the unit.

A still further object of the invention is to provide a simple electronic multiplying system having sufficient operating speed to provide a multiplied result simultaneously with the direct indication of weight.

More specific objects and advantages are apparent from the following description of a preferred form of the invention.

According to the invention, the improved multiplier comprises a multiple pulse generator one for each digit in the multiplier. Each of the pulse generators may comprise a series of individual trigger circuits each of which is tripped or triggered by the preceding such circuit and each of which produces an output pulse from that particular pulse generator. Alternatively, it may comprise a tapped delay line from which a plurality of pulses spaced in time for each input pulse may be obtained. The number of pulses to be generated in each generator is determined by selecting the input point to the series of individual trigger circuits or line tap so that the sequence of triggering action from that point to the end of the series will produce the desired number of pulses. The last pulse from each multiplier pulse generator is transmitted to the next generator of the series where the process is repeated. The series of pulses from each pulse generator is delivered to an appropriate stage of an electronic counter.

As applied to a weighing scale, the weighing scale is equipped with a slotted chart cooperating with photocell and lens system. The chart and lens system are movable relative to each other. The relative motion between the slotted chart and the lens system causes images of the slots to sweep over the photocell which then delivers a series of electrical impulses proportional in number to the weight on the scale. These impulses are transmitted through an amplifier to the first of the set of pulse generators. This first pulse generator preferably set according to the left hand digit of the multiplier delivers a number of pulses depending upon its setting to a first decade of an electronic counter. After the pulse traverses the first pulse generator it is delivered to a second pulse generator which is set according to the next digit of the multiplier. The pulses on the output lead of this pulse generator are delivered to the next decade of the electronic counter which feeds its output pulse into the output circuit of the first pulse generator and hence to the preceding stage or decade of the electronic counter. The final output pulse of the second pulse generator is delivered to a third such generator set according to the next digit of the multiplier. The output of this pulse generator is delivered to a third stage or decade of the electronic counter. A pulse generator is provided for each multiplier digit and a counter decade for each place in the product. The invention not only contemplates the overall combination of a plurality of pulse generators cooperating with various decades of an electronic counter but also includes the various types of pulse generators adapted to deliver a preselected number of pulses for each input pulse.

A preferred embodiment of the invention is illustrated in the accompanying drawings.

In the drawings:

FIGURE I is a schematic or block diagram illustrating the overall cooperation of a weighing scale, amplifier, pulse generators, and electronic counter.

FIGURE II is a simplified schematic diagram of a preferred form of pulse generator for use in the combination illustrated in FIGURE I.

FIGURE III is a graph or plot of wave forms illustrating the operation of one of the stages of the pulse generator.

FIGURE IV is a diagram similar to FIGURE II but showing a pulse generator constructed with transistors in place of thermionic tubes.

FIGURE V is a simple diagram illustrating the principle of operation of one of the transistors in the circuit shown in FIGURE IV.

FIGURE VI is a simple schematic diagram of another form of pulse generator similar to that shown in FIGURE II but employing resistance-capacity coupled circuits in place of the inductively coupled circuits shown in FIGURE II.

FIGURE VII is a simplified diagram of a delay line and associated equipment for producing predetermined pulse trains for each input pulse.

These specific figures and the accompanying description are intended merely to illustrate the invention and not to impose limitations on the claims.

Referring now to FIGURE I, a load or a package 1 of a commodity is placed upon a platform 2 of a weighing scale. The platform 2 is supported on a stem 3 that is guided by a check link 4 and supported and guided further by a weighing lever 5. The check link 4 and lever 5 are pivotally connected to a post 6 of a weighing scale frame. The lever 5 is supported and loads on the receiver 2 are counterbalanced by a counterbalance spring 7. The lever 5, between weighing operations, is supported on a catch 8 which when a weighment is to be made is moved out of the way of the lever 5 permitting it to oscillate once a distance determined by the spring 7 and the load 1 on the platform 2. Since no dashpot is employed the lever swings a distance twice as far as it would move if it were allowed to settle slowly to its rest position. The travel of the lever 5 under the influence of the load 1 and restraint of the spring 7 is measured or indicated by the passage of a slotted chart 9 through a light beam 10 that is produced by a light source bulb 11 and focused by a condensing lens 12 onto or through the chart and mask 13 to a projection lens 14. The projection lens 14 is focused so that the lines of the slots in the chart 9 are sharply focused on second mask 15 immediately in front of a photocell 16. For the ordinary retail counter scale the chart 9 is arranged with a slot for each $\frac{1}{100}$ of a pound. Thus if the scale had a capacity of 15 pounds there would be 1,500 slots in the chart. Since these are very minute it is necessary to employ optical magnification by means of the projection lens 14 to produce images of sufficient size to be accurately counted by the photocell 16.

The output of the photocell 16, in the form of electrical signals, is transmitted to an amplifier 17 of a type having relative short time constants and sufficient regeneration to serve as a pulse shaping circuit and thus deliver on its output lead 18 a pulse for each pulse of electricity from the photocell 16. The pulses are shaped to a wave form independent of the wave form output of the voltage from the photocell 16. The output pulses of the amplifier may be transmitted through a lead 19 to a first decade of a multi-decade electronic counter 20 shown here as having four decades. These decades, which may be constructed according to the circuits illustrated in Potter Patent No. 2,538,122, are arranged to count the output pulses from the amplifier and indicate such count in the various decades. Thus a first decade 21 receiving impulses directly from the lead 19 counts by hundredths of pounds with a capacity of $\frac{9}{100}$ of a pound. Upon the next impulse the first decade 21 resets to zero and transmits a single impulse to the next decade 22 which in turn counts by tenths of pounds. Similarly the third decade 23 counts by pounds and the fourth decade 24 counts by tens of pounds. Since the multi-decade electronic counter 20 comprising decades 21, 22, 23, and 24 is a simple or standard form of electronic counter such as is illustrated in the mentioned patent it is considered unnecessary to further descrbe it here.

Electrical pulses from the amplifier 17 are also transmitted through the lead 18 to a first pulse generator or multiplier 25. This first multiplier or pulse generator has a selector switch 26 arranged to control the number of pulses delivered to an output lead 27 for each pulse recevied on the lead 18. In the particular organization the multiplier 25 is set according to the dollars digit of the price of the commodity being weighed. A single output pulse is delivered from the multiplier 25 through its lead 28 to a second multiplier 29 having a selector switch 30 set according to the dimes digit of the price. This second multiplier 29 delivers a number of pulses through its output lead 31 according to the setting of the selector switch and delivers a single or final pulse through its output lead 32 to a third multiplier 33 having a selector switch 34 set according to the pennies digit of the price. This third multiplier has its output lead 35 connected directly to the input of a first or low order decade 36 of an amount counter 37. Likewise, the output lead 31 of the dimes multiplier 29 is connected to the next higher decade 38 of the amount counter 37. Similarly, the dollars multiplier 25 has its output lead 27 connected to a next higher decade 39 of the counter 37. Since the amplifier 17 delivers one pulse, in the arrangement shown, for each $\frac{1}{100}$ of a pound and since the multiplier 25 is set to the dollars value of the price it is apparent that each pulse delivered on the output lead 27 of the multiplier 25 represents one penny of the computed amount. Thus the counter decade 39 is labeled pennies since it counts the pennies value of the computed amount. Its carry pulses, one for each ten input pulses, are transmitted to a next decade or dimes decade 40 of the counter 37 and its carry pulses or output pulses are, in turn, transmitted to a dollars decade 41 and its pulses to a tens of dollars decade 42.

Similarly, each pulse on the output lead 31 of the dimes multiplier 29 represents $\frac{1}{10}$ of a penny or one mill in the computed amount. This valuation is obtained by passing the pulses on the lead 31 to the decade counter 38 arranged such that its carry pulses or output pulses, each representing a penny are fed back to the output amplifier of the multiplier 25 and through its amplifier to the lead 27 thus resulting in a carry impulse supplied to the pennies decade 39.

Similarly, the output pulses on the lead 35 of the third pulse generator or multiplier 33 represent values of $\frac{1}{100}$ of a penny each and are applied to the last decade 36 which is arranged so that its carry pulses are delivered through a lead 43 to the amplifier of the dimes multiplier 29 and thence pass through its output lead 31 to the next decade 38 of the counter.

In the arrangement there is no danger of simultaneous entry of pulses into any decade of the amount counter 37 because the scale pulses transmitted through the amplifier 17 pass through the dollar, dimes, and pennies multipliers 25, 29 and 33 in sequence and there are never any pulses from the counter decade 36 or 38 to be transmitted to the preceding multiplier generators 25 or 29 while these generators are producing pulses according to their input pulses. In other words, the multiplication takes place serially or sequentially rather than simultaneously in that the scale pulse is transmitted first through the multiplier 25 where the dollars value is added into the output counter 37 thence through the dimes multiplier 29 where the tenths of pennies value is computed and then into the pennies multiplier 33 where the hundredths of pennies value is computed and sent to the counter 37 by way of the preceding multiplier amplifier.

The speed of operation of the electronic multiplier circuits is such that the computed price or amount appears in the counter 37 simultaneously with the appearance of the weight value in the counter 20. These values, as indicated in the counters 20 and 37, may be extracted electrically by any of the well known computer output techniques and used to operate printing devices or other information storing equipment. After the information has been read or otherwise obtained or extracted from the counters the counters may be reset to zero manually by switching the proper circuits as indicated in the Potter Patent No. 2,538,122. This resetting operation may be made simultaneously with or part of the step of releasing the catch 8 to start the next weighing operation.

A circuit suitable for use as one of the pulse generators or multipliers 25, 29, or 33 is illustrated schematically in FIGURE II. This circuit comprises a plurality or chain of blocking oscillators, i.e., oscillators that are arranged to generate one cycle for each input impulse. The oscillators are arranged so that any one of them can be triggered by the output of the amplifier 18 as transmitted through a portion 26a of the selector switch 26 and it in turn triggers or initiates the cycle of the following stage of the chain of oscillators. A common connection to each of the oscillator stages provides an output to the amplifier portion of the multiplier and after amplification the pulses are delivered to leads 27, 31 or 35 leading to the respective counter decades. The oscillator comprises a plurality of twin triode vacuum tubes 50 the first tube 50 serving for stages numbers 9 and 8 of the oscillator, the tube 51 serving stages 7 and 6 (7 only being shown), tube 53 serving for stages 3 and 2 of the oscillator chain while the tube 54 serves for stage 1 and the output amplifier of the oscillator chain.

Each stage of the oscillator chain, in addition to a half section of the dual triode, includes a transformer 55 suitably designed for operation at high frequencies, a grid resistor 56 and a damping resistor 57. The stages are fed from a B+ line 58 from which current flows through a parallel combination of a plate winding 59 of the transformer and the damping resistor 57 to a plate 60 of the first section of the triode. A cooperating cathode 61, in parallel with the cathodes of the other stages of the oscillator chain, is connected to ground through a common cathode lead 62 and a common cathode resistor 63. A grid 64 of the triode section 50 is connected to a grid winding 65 of the transformer 55 the other end of the winding being connected to the grid resistor 56. This junction between the winding 65 and resistor 56 is also connected through a lead 66 to the number 9 terminal of the selector switch 26. The grid resistors of the various stages are connected to a common bias lead 67 connected to the negative terminal of the plate power supply and maintained at a sufficiently negative voltage to prevent current conduction through any of the triodes.

In the operation of this circuit a positive going signal applied from the amplifier 17 through the lead 18 and lead 66 drives the grid 64 sufficiently positive to start current flow. This current flow by inductive action through the transformer 55 provides additional positive voltage at the grid 64 thus increasing the current flow through the tube. Thus the inductive coupling through the transformer 55 is in the direction to sustain or produce oscillations. The current builds up until the tube is saturated and current flow is limited by the cathode resistor 63. At saturation the flux in the transformer 55 is no longer changing and hence no voltage is generated in the grid winding 65 thereby permitting the grid 64 to return to its negative voltage condition thus cutting off current flow through the tube. As the current is cut off the tube plate voltage, that is the voltage at the plate 60, tends to rise quite rapidly as a result of the flux collapse in the transformer 55. This positive going voltage at the plate 60 is transmitted through a coupling condenser 68 to the input circuit or grid circuit of the following stage of the oscillator chain corresponding to the number 8 position. This stage thereupon goes through a similar cycle of events and produces an output pulse that is transmitted to the next oscillator of the chain. This continues through the chain until the pulse finally arrives at the number 1 stage. The output of the number 1 stage appearing at its plate 70 is transmitted through a coupling condenser 71 to all but the zero contact of the terminals of a second deck 26b of the selector switch 26. The moving contact of this second deck 26b is connected to the output lead 28 of the first multiplier section for transmission of the impulse to the following multiplier 29.

As each of the respective stages goes through its cycle of operation it produces a sharp positive pulse voltage on the common cathode lead 62 which is transmitted through a coupling condenser 73 and parallel combination of rectifier 74 and resistor 75 and grid current resistors 76 to a grid 77 of the output section or amplifier 54 of the oscillator chain. The grid 77 cooperates with a plate 78 and cathode 79 to provide output pulses on the leads 27, 31, or 35 depending upon which section of the complete system is being considered. The plate circuit of the amplifier includes a plate resistor 80 and a choke coil 81 serving to improve the high frequency response of the amplifier. Positive going carry pulses from the following decade of the counter are transmitted on the lead 43 of FIGURE I and coupling condenser 83 to the junction between the resistors 75 and 76 thereby producing a similar output pulse on the leads 27, 31, or 35. The grid 77 is normally biased so as to produce current cut off in the tube by a connection through a grid resistor 84 to the negative plate supply voltage lead or B— lead.

The voltages appearing at the plate, grid and cathode of the oscillator stages during a cycle of operation are illustrated in FIGURE III. As shown in this figure the grid voltage $E_g$ executes one cycle of approximately a sine wave voltage. The first positive going portion of the curve $E_g$ in FIGURE III is produced by the input pulse received over the lead 18. The amplifying action of the stage through the transformer 55 then produces the continuing positive going portion rising to a crest and then dropping suddenly to a negative value. As the grid goes positive, tending to draw current, the cathode potential $E_c$ tends to execute the somewhat similar wave form because of the common cathode resistor 63. The plate voltage $E_p$ drops sharply at the start of current flow through the tube, dropping to a minimum value when the grid is at its most positive potential representing rate of increase of plate current through the tube. Then as the tube reaches saturation and the plate current no longer increases the plate voltage again goes positive and the current flow through the transformer decreases driving the grid negative.

During the positive going portion of the plate voltage wave form a positive voltage impulse is transmitted through the output condenser 68 to the following stage. The time constant of the coupling condenser 68 and the grid resistor 56 of the following stage is made short compared to the time of one oscillation of the oscillator so that the following grid is driven positive when the plate voltage of the preceding stage is going positive at its most rapid rate. Since this occurs at the end of the cycle of the first stage the timing or delay from this stage to the next stage is quite definitely and accurately maintained.

When the impulse from the amplifier 18 is applied to the grid circuit of the number 9 stage of the oscillator chain, nine impulses are produced by the chain of oscillators and amplified through the amplifier section of the tube 54 for transmission to the associated stage of the counter. If a fewer number of pulses are required as when the corresponding digit of the price has a value other than nine the selector switch 26 including its sections 26a and 26b are set for the desired number of pulses thereby transmitting the amplifier pulse to one of the oscillator stages in the chain corresponding to that particular number. Thus if the switches are in the number 4 position as indicated in the drawing, the impulse is applied to the grid circuit of the fourth stage. In this setting the impulse travels from the fourth stage to the end of the line thereby producing four impulses for the amplifier section for transmisison to the counter. Should this particular multiplier digit in the price be a zero then the switch 26 is set to its zero position so that the impulse from the amplifier lead 18 is transmitted directly through a lead 86 connecting the zero terminal of the first deck of the switch to the zero terminal of the second deck so that the impulse passes directly to the next multiplier without producing any pulses whatsoever in the first multiplier.

This relatively simple circuit comprising a single two-deck switch, five dual triodes, nine simple coupling transformers, and two resistors and condenser for each stage make it possible to produce, for each scale impulse, from zero to nine inclusive pulses of voltage suitable for counting in an electronic counter. Thus this circuit makes it possible to multiply by successive addition at a very rapid rate by factors from zero to nine inclusive.

By cascading several such oscillator chains as indicated in FIGURE I it is possible to extend the capacity of the circuit to multipliers having a plurality of digits.

In designing such a circuit the time for one cycle of one of the oscillator stages may be taken as a unit time interval and when three such oscillator chains are employed at least 27 unit time intervals must elapse between successive impulses received from the scale amplifier system. It is comparatively easy to design the circuit so that the unit time interval for each of the oscillator stages is in the order of few microseconds, practical circuits being capable of operating at one or two microseconds per stage. Such operating speeds require counters capable of counting at rates up to approximately one megacycle. The oscillator may be operated at slower speeds by suitable design of the transformers so as to require from 10 to 15 microseconds per stage thus permitting electronic counters having maximum counting rates of 100 kilocycles to satisfactorily follow the output pulses of each of the oscillator chains. Such an arrangement, however, sets a limit on the maximum speed at which the impulses may be delivered from the scale and thus may unduly restrict the speed of the system. The higher speeds are, of course, preferable.

The pulse generator illustrated in FIGURES II and III employs electronic tubes as the amplifying elements for each of the oscillators. A similar pulse generator may be constructed using resistances, condensers and transistors. Such a circuit is illustrated in FIGURES IV and V. Such a circuit comprises a chain of individual oscillator stages all of the stages being similar and arranged so that the output pulse from each stage may serve as the input pulse for the next. Each stage comprises a transistor having a base 100, a collector electrode 101, and an emitter electrode 102. The base 100 is connected through a 3,000 ohm resistor 103 to a grounded lead 104. The collector electrode 101 is connected through a load resistor 110 of 3,000 ohms to a negative supply lead maintained at approximately minus 25 volts. The emitter electrode 102 is connected directly to ground through a small condenser 105 of approximately 500 micromicrofarads. The emiter is also connected to an output lead through a small coupling condenser 106, the output lead 107 being grounded through a resistor 108 which with the condenser 106 provides a time constant short in comparison with the time of one cycle of each of the transistor stages. The emitter is supplied with voltage at approximately minus 15 volts through a resistor 109 of approximately 5,500 ohms. Input pulses from a lead 118 are transmitted to the various bases 100 of the various transistors according to which of the stages is to be initially energized. Likewise, a trigger voltage of each stage, which is developed across the load resistor 110, is applied through a coupling condenser 120 to the base of the next transistor stage.

Preferably the transistors are of the point contact type and the circuit operates by reason of the amplifying action of each of the transistors. Normally the emitter is biased sufficiently negative so as to inhibit current flow through the transistor from its base to its collector electrode. Upon the application of a negative pulse of voltage to the base 100 the bias between the base and the emitter is reduced to a point where the emitter draws appreciable current. This current supplied by the condenser 105 results in a much larger current flow from the base to the collector thus resulting in a continuing negative voltage applied to the base thus holding the bias at a low value. As the emitter draws current from the condenser its voltage drops or goes negative thus resulting in decreasing the current flow through the transistor resulting in a positive going voltage appearing at the base and a negative going voltage appearing on the collector electrode. With the combination of values shown the action is regenerative or of a trigger nature in that little current flows in the collector circuit until the emitter bias is reduced by the negative voltage supplied to the base. When this occurs the current flow through the base to the collector suddenly increases and the current flow from base to emitter suddenly rises to a large value by the amplifying action resulting from the changes in voltage at the electrodes. Then as the emitter current decreases as the condenser 105 is charged by current flow from the emitter, the current flow decreases until suddenly it reaches a critical point when it is cut off suddenly to zero value. The negative voltage impulses at the emitter electrode are transmitted through the coupling condenser 106 to the output lead 107 and since the time constant of the condenser 106 and the common grounding resistor 108 it is small compared to the time constant resulting from the flow of current to the condenser 105 this circuit has the effect of differentiating the emitter voltage signal thus producing a peaked wave form as shown above the lead 107. This wave form is transmitted to the counter after amplification and serves to drive the counter a number of steps depending upon how many of the transistor stages was included and operated by each impulse from the scale. As before a selector switch such as the switch 125 is included to transmit the impulse from the scale amplifier to the selected one of the transistor stages. Likewise the output from the number 1 transistor stage, the last one in the chain, is fed back through the second section of the switch to the first or number 9 stage of the following pulse generator.

FIGURE V illustrates the relationship between the emitter voltage and emitter current. As shown in this figure with a load line such as a line 127 drawn to correspond to the resistance of the emitter resistor 109 the static or stable operating condition occurs at a point P with the emitter drawing a slight negative current and the collector current cut off. The pulse applied to the base by the amplifier connected to the scale has the effect of momentarily reducing the bias so that transistor operating point moves from point P along the characteristic curve to a critical point Q. After passing the point Q the current suddenly rises because of the amplifying action of the transistor and the current through the emitter and collector increases until limited by the circuit constant at a point R on the characteristic curve. At this time the emitter is drawing a relatively heavy current, the current flowing from the base to the emitter to charge the condenser 105 in the negative direction so that the operating point then follows from R along the curve to a second critical point at the valley marked S. Upon reaching this point the emitter condenser 105 is charged to a higher negative voltage and this is sufficient at the reduced collector current to cause the transistor to suddenly cut off and the operating point then follows trigger-wise from the point S to a point on the characteristic curve below the point P. The system then returns to a stable state, with the transistor drawing a slight negative current, at the point P. Thus for each pulse voltage applied to the base of the transistor the transistor executes one cycle and transmits an output pulse to the counter and another pulse to the following transistor stage of the chain so that the following stage can then generate its pulse and so on to transmit the pulse throughout the chain of transistors.

The pulse generator chain for generating a series of a selectable number of pulses for each impulse received from the weighing scale may also be constructed of multivibrators, a form of resistance capacity coupled oscillator. Such a circuit arrangement is illustrated in FIGURE VI. As shown in this figure the oscillator chain comprises a series of stages, each having a dual triode, 130, 131 to 139. Tubes 132 to 138 corresponding to stages 7 to 2 inclusive are not included on the drawings. Each of the multivibrator stages including its twin triode tube consists of a pair of cathodes 140 and 141 connected in parallel through a cathode resistor 142 to a grounded return lead 143 that is common to all of the stages. Each of the triodes also includes a plate or anode 144 cooperating with the cathode 140 and a second anode 145 cooperating with the cathode 141. Control grids 146 and 147 cooperate with cathodes 140 and 141 respectively. The anode 144 is connected through a resistor 148 of approximately 100,000 ohms to a B+ supply lead 149. Likewise the anode 145 of the second half of the triode is connected through a 50,000 ohm resistor 150 to the supply lead 149. The control grid 146 cooperating with the cathode 140 is connected through a 500,000 ohm resistor 151 to the grounded lead 143 while the second control grid 147 is connected through a one megohm resistor 152 to the positive supply voltage lead 149. The anode 144 is further connected by a 1,500 micromicrofarad condenser 153 to the control grid 147. Furthermore, the cathode connection is connected through a 100 micromicrofarad condenser 154 to a common output lead 155 which is grounded through a 100,000 ohm resistor 156. The output lead 155 is connected to a corresponding decade of an electronic counter associated with the pulse generator.

Each of the multivibrator circuits is coupled to the next in the chain by a 33 micromicrofarad condenser 157 which serves to connect the second grid 147 of one stage to a first grid 160 (corresponding to the grid 146) of the following stage.

Input pulses from the scale amplifier or a preceding multiplier are supplied through a lead 161 and a coupling condenser 162 to the moving arm 163 of a multi-point selector switch and from the taps of the switch through a lead 164 to the number 9 stage grid 146 or through lead 165 to the number 8 stage or through other leads 166 to the other stages of the oscillator chain. Thus a number of stages of the oscillator chain are included depending upon the selection made through the switch 163.

The number 1 stage comprising the dual triode 139 has its output connection 170 connected through a lead 171 to all of the points 172 except the zero point of a second deck of a selector switch. A wiper 173 of this deck is connected through an output lead 174 to the input switch of the next multiplier. As in the preceding circuits should the value for this particular multiplier be selected as zero the scale impulse or the pulse in the preceding multiplier is transmitted directly from the first deck of the switch through a lead 175 to the second deck and hence out through the output connection 174.

In this particular circuit the output lead 155 to the counter has a pulse of voltage appearing thereon as each of the multivibrators goes through its cycle of operation. In the quiescent or stable state each of the multivibrators is drawing current through its right hand section as illustrated in the drawing which for the number 9 stage comprises the resistor 150, plate 145 and cathode 141. This flow of current, since the control grid 147 is drawing current through the one megohm resistor, is determined entirely by the magnitude of the resistors 142 and 150. The application of a positive pulse of voltage to the control grid 146 causes current flow through the first half of the triode which by the amplifying action and the negative going signal of the plate 144 coupled through the condenser 153 drives the second half control grid 147 negative so as to cut off the flow of current through the second half or right hand section of the tube leaving the left hand section of the tube drawing current at a rate determined by the 100,000 ohm plate resistor 148. The current flow through the tube under this condition is about half of what it was under the prior state. When the condenser 153 is charged through the resistor 152 so that the second half of the tube again draws current the tube quickly returns to its initial state thereby increasing the current flow through the cathode resistor 142. This positive increase in voltage resulting from the increased current appears on the output lead 155 as a short duration pulse determined in time by the time constant of the coupling condenser 154 and the common resistor 156. Likewise the positive going signal appearing at the grid 147, as the first half of the triode cuts off, is transmitted through the condenser 157 to initiate a cycle in the following stage.

While this circuit is economical to build the output pulses on the lead 155 are not as great as those produced by the inductively coupled oscillator circuits illustrated in FIGURE II. This is because of the overlapping or simultaneous transfer of current flow through successive cathode resistors 142 of the several stages whereby a portion of the output voltage from one stage is lost because of the simultaneous reverse voltage pulse from the next stage.

These several circuits illustrating various types of electronically controlled pulse generators all serve the same function of generating a series of pulses of selected number suitable for operating various stages or decades of an electronic counter. In each case the multiplication takes place serially so that there is no danger of simultaneous entry of values into any of the counters and therefore no chance of error from such simultaneous entry.

The improved multiplier may also be constructed from a delay line together with suitable amplifiers. Such an arrangement is shown in FIGURE VII. This circuit comprises a tapped delay line 200 having a delay per section of from one to two microseconds. Shaped pulses from an amplifier transmitting pulses from the scale or other multiplicand sources having a time duration less than the time delay of one section are applied to a selector switch 201 having ten points corresponding to the possible values of a digit of the multiplier. The pulses from the switch points are transmitted through diode rectifiers 202 to taps 203 of the delay line. The number one to number nine switch points are interconnected by rectifiers 204 arranged to pass current from the high valued points to the low valued points. The ends of the delay line are terminated in resistors 205 and 206 to prevent reflections of the voltage pulses from the ends of the line.

The input pulses applied to any selected switch point are transmitted simultaneously to the associated tap of the delay line and all taps to the right as shown in the figure. Thus wave trains of $n$ pulses are produced (where $n$ is the number of the tap at which the switch is set) that travel toward the ends of the line 200. As each pulse of the train reaches the right end of the line it drives a grid 207 of an amplifier in the positive direction thus producing a negative pulse at a plate 208 of the amplifier. The negative pulses are transmitted directly to a corresponding decade of an electronic counter and through a line 209 and condenser 210 to a detector tube 211. The detector tube 211 and a multivibrator 212 are required to generate a time delayed pulse for the next delay line for the next digit of the multiplier. In the previous arrangements the time delayed pulse was taken from the last stage of the generator series where only a single pulse occurs. In the delay line all the pulses appear at the end.

Therefore the detector 211 is provided to produce at its cathode 213 a positive voltage pulse that rises sharply with the first pulse coming from the amplifier plate 208 but which decays slowly according to the time constant of a resistor 214 and condenser 215 in the cathode circuit of the detector 211. The voltage pulse at the cathode 213 thus corresponds to the envelope of the train of pulses plus an exponential decay portion after the last pulse. This envelope pulse, transmitted through the multivibrator as a pulse shaper appears as a sharp positive pulse on a line 216 at the end of the envelope pulse and is transmitted to the selected taps of the next delay line.

When this system is used the electronic counters must be capable of counting at least a million pulses per second since the time delay between pulses arriving at the amplifier grid 207 is in the order of one to two microseconds.

This arrangement, as those previously described, produces a controlled number of pulses for each input pulse and thus provides the elementary form of multiplier unit. Each of the circuits is positive and does not depend upon counting and gating the impulses but rather generates only those that are needed.

These circuits, simple in form, make it possible to provide medium speed multiplying action in an electronic computing system suitable for use with weighing scales or similar apparatus.

Various modifications may be made in the particular circuits without departing from the scope of the invention.

Having described the invention, we claim:

1. In a pulse generator, in combination, a series of blocking oscillators each of which comprises an electron tube having an anode and a grid, a coupling transformer inductively coupling an anode circuit of the tube to its grid circuit, said transformer having a first winding in series with an anode of the tube and a second winding having a first end connected to a grid of the tube, a grid resistor connecting a second end of the second winding to a bias voltage, a capacitance circuit connecting an anode of one tube to the junction between the second winding and the grid resistor of the next tube in the series, the time constant of the capacitance and grid resistor being short compared to the time of a cycle of oscillation, whereby each grid receives a positive voltage signal as current cutoff occurs in the next preceding oscillator anode circuit.

2. In a pulse generator, in combination, a series of blocking oscillators each of which comprises an electron tube having a grid and an anode, a transformer inductively coupling a grid of the tube to its anode, said transformer having a first winding connected to the anode and having a second winding connected to the grid, a grid resistor connecting the second winding to a bias voltage sufficiently negative to produce anode current cutoff, a capacitor connecting each anode to the grid resistor of a following oscillator of the series for reducing the negative voltage on the grid as anode current is cut-off in the next preceding oscillator, the time constant of said capacitor and grid resistor being small compared to the time of an oscillation, signal means for applying a positive signal to the grid of a selected one of said oscillators, and an output circuit responsive to the current flow in each oscillator.

3. In a pulse generator, in combination, a series of blocking oscillators, each of said oscillators comprising a coupling transformer and an electron tube having an anode, a grid, and a cathode, said transformer having anode and grid windings connected respectively to the anode and grid of the tube and being connected to inductively couple the anode circuit of the tube to the grid circuit, a grid resistor connecting the grid winding to a source of bias voltage to hold the grid at a potential to produce anode current cutoff, a capacitor connecting the anode of one oscillator to the grid resistor of the next, the time constant of said capacitor and resistor being small compared to the time of an oscillation of one of the oscillators, and a load resistor common to the cathode circuits of a plurality of the oscillators.

4. In a pulse generator according to claim 3 a source of input signals, and means for applying said signals to the grid winding of the transformer of a selected one of said series of oscillators to start an oscillation of the next oscillator of the series.

References Cited in the file of this patent

UNITED STATES PATENTS

| | | |
|---|---|---|
| 2,373,134 | Massonneau | Apr. 10, 1945 |
| 2,398,771 | Compton | Apr. 23, 1946 |
| 2,428,089 | Mumma | Sept. 30, 1947 |
| 2,442,428 | Mumma | June 1, 1948 |
| 2,567,247 | Spalding | Sept. 11, 1951 |
| 2,575,331 | Compton | Nov. 20, 1951 |
| 2,585,722 | Baird | Feb. 12, 1952 |
| 2,595,045 | Desch et al. | Apr. 29, 1952 |
| 2,600,268 | Sagalyn | June 10, 1952 |
| 2,639,378 | Moerman | May 19, 1953 |
| 2,790,599 | Gloess | Apr. 30, 1957 |
| 2,812,134 | Adelaar | Nov. 5, 1957 |
| 2,831,972 | Foote | Apr. 22, 1958 |
| 2,835,804 | Luther | May 20, 1958 |
| 2,954,167 | Williams | Sept. 27, 1960 |
| 2,961,160 | Bell et al. | Nov. 22, 1960 |

OTHER REFERENCES

Waveforms, Chance et al., 1949, page 221.